(12) United States Patent
Tanikawa et al.

(10) Patent No.: US 6,224,683 B1
(45) Date of Patent: May 1, 2001

(54) PROCESS FOR DEMINERALIZING A SUGAR SOLUTION

(75) Inventors: Kouji Tanikawa; Fumihiko Matsuda; Kikuzo Kaneko; Makoto Tomizawa; Takayuki Masuda, all of Tokyo (JP)

(73) Assignee: Organo Corporation, Tokyo (JP)

( * ) Notice: Subject to any disclaimer, the term of this patent is extended or adjusted under 35 U.S.C. 154(b) by 0 days.

(21) Appl. No.: 09/402,415

(22) PCT Filed: Feb. 5, 1999

(86) PCT No.: PCT/JP99/00486

§ 371 Date: Oct. 4, 1999

§ 102(e) Date: Oct. 4, 1999

(87) PCT Pub. No.: WO99/40228

PCT Pub. Date: Aug. 12, 1999

(30) Foreign Application Priority Data

Feb. 5, 1998 (JP) .................................................... 10-37964

(51) Int. Cl.[7] .................................................. C07B 63/00

(52) U.S. Cl. ............................................................ 127/46.3

(58) Field of Search ................................................. 127/46.3

(56) References Cited

U.S. PATENT DOCUMENTS 6,099,654 * 8/2000 Kaneko et al. .................... 127/46.2

FOREIGN PATENT DOCUMENTS

| 0 663 224 | 7/1995 | (EP) . |
| WO 95 16794 | 6/1995 | (WO) . |
| WO 96 10650 | 4/1996 | (WO) . |

OTHER PUBLICATIONS

Patent Abstract of Japan vol. 098, No. 006, Apr. 30, 1998 (Apr. 30, 1998)–& JP 10 042899 A (Japan Organo Co Ltd.), Feb. 17, 1998 (Feb. 17, 1998) cited in the application abstract.

* cited by examiner

*Primary Examiner*—David Brunsman
(74) *Attorney, Agent, or Firm*—Norris McLaughlin & Marcus

(57) ABSTRACT

In demineralization of a beet sugar solution before boiling as the starting solution with a simulated moving bed chromatographic separator comprising a plurality of packed column units packed with a strongly acidic cation exchange resin in a salt form having an average grain size of 300 to 500 $\mu m$ and a uniformity coefficient of at most 1.2 as chromatographic packing (separating packing), and each provided with a starting solution feed inlet, an eluent water feed inlet, a withdrawal outlet for a fraction of a component having a strong affinity for chromatographic packing ("strong-affinity component"), and a withdrawal outlet for a fraction of a component having a weak affinity for chromatographic packing ("weak-affinity component"); use is made of circulating pumps, the number of which is at least half of the number of the packed column units, and the beet sugar solution before boiling is demineralized under the following conditions: starting solution feed rate/eluent water feed rate volume ratio=1/2.5 to 1/3.5, strong-affinity component fraction withdrawal rate/weak-affinity component fraction withdrawal rate volume ratio=0.5/1 to 1.2/1, and circulating flow rate=25 to 80 vol. %/hr. based on chromatographic packing in a slowest flow velocity zone in the circulation system, whereby a sucrose fraction having a high sucrose concentration is obtained using a small amount of eluent water with a large throughput.

2 Claims, 1 Drawing Sheet

PROCESS FOR DEMINERALIZING A SUGAR SOLUTION

This application is a 371 of PCT/JP99/00486 filed Feb. 5, 1999.

The present invention relates to a process for demineralizing a beet sugar solution before sugar "boiling" (hereinafter referred to as "boiling"). Herein, the term "beet sugar solution before boiling" is intended to mean not only a beet sugar solution before first boiling but also a beet sugar solution (molasses or the like) before boiling in the case where a residue after boiling (i.e., molasses) is to be subjected again to boiling, and to encompass those in cases where an ion exchange step and/or a concentration step, if necessary, is taken after the demineralization step according to the present invention and before the boiling step, and should not necessarily be construed as being limited to those in cases where the boiling step is taken later.

BACKGROUND ART

There are various conventional methods of refining sucrose (beet sugar) abstracted from sugar beet, representative examples of which include the following methods having respective merits and demerits.

A method (1) is one comprising sugar beet cutting, extraction, carbonation (coagulation and sedimentation for removal of impurities through adsorption thereof on a precipitate of calcium carbonate during formation of the precipitate by adding lime milk to raw juice obtained by extraction and blowing carbon dioxide therein), filtration, softening (removal of hardness components such as Ca and Mg with cation exchange resin in Na form), concentration, and boiling (boiling sucrose crystals out of the concentrate through crystallization). This method is simple because no demineralization is done although softening is done, but involves demerits of poor sucrose crystallization during the boiling step and hence formation of a large amount of molasses because of an insufficient sucrose purity of the sucrose-containing concentrate as the object of boiling.

A method (2) is one comprising the same sugar beet cutting, extraction, carbonation and filtration as in the method (1), and further comprising subsequent softening and demineralization by ion exchange treatment (removal not only of hardness components such as Ca and Mg but also of other salt components), concentration, and boiling. Use of the following four kinds of ion exchange resins: a strongly acidic cation exchange resin, a weakly basic anion exchange resin, a strongly basic anion exchange resin and a weakly acidic cation exchange resin in this order is best for the ion exchange treatment in this method. This method does not involve the demerits of the method (1), but involves demerits of frequent regeneration of the ion exchange resins, use of large amounts of regenerants, and various troublesome treatments of regeneration waste because much salts are contained in sucrose-containing filtrate as the object of ion exchange treatment to decrease the throughput per unit quantity of the ion exchange resins. In view of much salts as mentioned above, decomposition of sucrose by the cation exchange resin in the hydrogen ion form (H form) in the first stage of ion exchange treatment must be avoided by cooling the above-mentioned sucrose-containing filtrate once to at most 10° C. for the treatment thereof with the cation exchange resin in the H form (so-called cold process demineralization), and the resultant treated solution must be heated up to a temperature of 50 to 55° C. for the second stage of ion exchange treatment thereof (polishing for demineralization, decoloration, deodorization, etc.), thus giving rise to demerits of complexity of operations and large energy costs.

A method (3) is a recently proposed one comprising filtration, softening, concentration, demineralization by ion exclusion chromatographic separation, concentration, and boiling without carbonation after the same extraction as in the foregoing 2 methods (PCT International Publication No. WO 95/16794). This method, which does not involve the demerits of the method (2) but indispensably requires filtration in order to avoid clogging of a chromatographic separator and an increase in the pressure loss therethrough (no details of filtration are described in the above-mentioned patent literature), involves demerits such as an incapability of removal of sticky substances derived from the plant (beet) and called "gum" as well as colloidal substances, a difficulty in filtration, a great cost involved in the filtration step, so grave a pressure loss in chromatographic separation due to colloidal substances unremovable by filtration as to result in a failure in liquid passage through the chromatographic separator in an extreme case, an unavoidable decrease in the feed rate of a starting solution (starting chromatographic solution) as an object of chromatographic separation for decreasing the pressure loss in the chromatographic separation operation, and a failure in obtaining such high-quality sucrose crystals as in the method (2) due to insufficient demineralization. The cause of all such demerits is that the coagulation and sedimentation step such as the carbonation step is not taken.

Demineralization of a beet sugar solution before boiling according to such ion exchange treatment or chromatographic separation is aimed at improving the quality of sucrose crystals precipitated by later boiling. Further, sucrose is recovered as much as possible by repeating demineralization (by ion exchange or chromatographic separation), concentration, and boiling of molasses obtained after boiling.

Ion exchange resins used in demineralization by such conventional ion exchange as in the method (2) must be subjected to the regeneration step at a certain point of time. Regenerant chemicals for use in this step and washing water for use in the subsequent washing step pose a problem of raising the cost of demineralization. Further, various treatments of regeneration waste discharged in the regeneration and washing steps are so troublesome as to raise the product cost. On the other hand, when demineralization is done by chromatographic separation like in the method (3), the throughput is limited if a high separability of components is to be attained, with the result that the separator must inevitably be scaled up to pose a problem of a high construction cost thereof. In chromatographic separation, sucrose as the desired component is diluted with eluent water to pose another problem of raising the running cost of the later concentration step. Still another problem is a loss of the desired component (sucrose) involved in separation.

An object of the present invention, which has been made in view of the foregoing problems of the prior art technologies, is to provide a process for efficiently demineralizing a beet sugar solution before boiling.

DISCLOSURE OF THE INVENTION

As a result of extensive investigations on demineralization of a beet sugar solution before boiling according to simulated moving bed chromatographic separation with a view to solving the foregoing problems, the inventors of the present invention have found operating conditions under which a sucrose fraction having as high a sucrose concentration as possible can be obtained with a throughput increased substantially at least two times as much as the general one in conventional simulated moving bed chromatographic separation while maintaining a high separation performance and diminishing the loss of sucrose as the desired component and the amount of used eluent water as much as possible.

More specifically, the inventors of the present invention have found out that the loss of sucrose as the desired component can be decreased to at most 0.7%, the throughput (throughput per hour, based on whole chromatographic packing) can be increased to at least 7 vol. %, and the dilution ratio of the desired component (value calculated by dividing the sucrose concentration of a chromatographically separated sucrose fraction by the sucrose concentration of a beet sugar solution subjected to chromatographic separation) can be lowered to less than 2 by feeding a starting solution and eluent water at a starting solution/eluent water volume ratio of 1/2.5 to 1/3.5, withdrawing fractions at a strong-affinity component fraction/weak-affinity component fraction volume ratio of 0.5/1 to 1.2/1, and setting a circulating flow rate of 25 to 80 vol. % /hr. based on chromatographic packing (separating packing) in a slowest flow velocity zone in the circulation system during the course of demineralization of the beet sugar solution before boiling with a simulated moving bed chromatographic separator wherein use is made of a strongly acidic cation exchange resin in a salt form having an average grain size of 300 to 500 $\mu$m and a uniformity coefficient of at most 1.2 as chromatographic packing, and of circulating pumps, the number of which is at least half of the number of the packed column units. The present invention has been completed based on this finding.

More specifically, the present invention provides a demineralization process for demineralizing a beet sugar solution before boiling (starting solution) with a simulated moving bed chromatographic separator comprising a plurality of packed column units packed with a strongly acidic cation exchange resin in a salt form having an average grain size of 300 to 500 $\mu$m and a uniformity coefficient of at most 1.2 as chromatographic packing (separating packing) and linked in endless series to form a circulation flow path, each of the packed column units being provided with a starting solution feed inlet, an eluent water feed inlet, a withdrawal outlet for a fraction of a component having a strong affinity for chromatographic packing (hereinafter referred to as a "strong-affinity component"), and a withdrawal outlet for a fraction of a component having a weak affinity for chromatographic packing (hereinafter referred to as a "weak-affinity component"); characterized in that use is made of circulating pumps, the number of which is at least half of the number of the packed column units, and in that the beet sugar solution before boiling is demineralized under such conditions that the starting solution feed rate/eluent water feed rate volume ratio is 1/2.5 to 1/3.5, the strong-affinity component fraction withdrawal rate/weak-affinity component fraction withdrawal rate volume ratio is 0.5/1 to 1.2/1, and the circulating flow rate per hour is 25 to 80 vol. % based on chromatographic packing in a zone where the flow velocity is slowest in the circulation system.

The present invention will now be described in detail.

It has been found out that sucrose can be recovered at a high recovery while decreasing the amount of used eluent water when the strong-affinity component fraction withdrawal rate/weak-affinity component fraction withdrawal rate volume ratio is set to be 0.5/1 to 1.2/1. It is an axiom that the object of separation (starting solution) is diluted with eluent water in chromatographic separation. Having regard to the load of the sucrose fraction on the later concentration step, the lower the dilution ratio, the better. At a low dilution ratio, however, the precision of separation (degree of separation of nonsucrose compounds such as salts) must be sacrificed. The inventors of the present invention have made intensive investigations with a view to decreasing the amount of used eluent water as much as possible to find the foregoing suitable 2-fraction withdrawal rate volume ratio. The foregoing antinomy between the dilution ratio and the precision of separation can be eliminated by taking the foregoing suitable 2-fraction withdrawal rate volume ratio. More specifically, the amount of used eluent water can be decreased to a level represented by the formula: starting solution feed rate/eluent water feed rate volume ratio=1/2.5 to 1/3.5 while keeping the separation performance high.

On the other hand, although the circulating flow rate in the circulation system must be increased in order to perform a high-load (large-throughput) operation, not only there is a limit to an increasable circulating flow rate in chromatographic separation treatment of the beet sugar solution (starting solution) which is supplied as one having a high concentration and a high viscosity in most cases, but also an increase in the circulating flow rate adversely affects the separation performance. When the circulating flow rate is set only for that reason to be low as usual, separation may be good, but the separator must be scaled up for securing a given throughput. The most influential is a circulating flow rate in a zone where the flow velocity is slowest in the circulation system. This zone is usually one immediate downstream of the weak-affinity component fraction withdrawal position. The zone where the flow velocity is slowest in the circulation system (hereinafter often referred to as the "slowest flow velocity zone in the circulation system") is shifted as the above-mentioned withdrawal position is intermittently displaced. It has been found out that the optimum balance can be acquired among the separation performance, the throughput, the amount of used eluent water and the dilution ratio when the circulating flow rate in the slowest flow velocity zone in the circulation system is set to be at least 25 vol. % /hr. based on chromatographic packing at the aforementioned starting solution feed rate/eluent water feed rate volume ratio and at the aforementioned 2-fraction withdrawal volume ratio. On the other hand, the circulating flow rate in the slowest flow velocity zone in the circulation system must be at most 80 vol. % /hr. based on chromatographic packing from the standpoint of the pressure loss, the pressure resistance of equipment and the separation performance.

The inventors of the present invention have also found designing requirements of a general simulated moving bed chromatographic separator for use in the demineralization process of the present invention from the standpoint of minimizing the pressure loss in the chromatographic system and maintaining a given separation performance. Specifically, the number of circulating pumps must be at least half of the number of packed column units, and the chromatographic packing must be a strongly acidic cation exchange resin in a salt form such as the Na form and/or the K form, having an average grain size of 300 to 500 $\mu$m and a uniformity coefficient of at most 1.2. When the circulating flow rate in the slowest flow velocity zone in the circulation system of such a separator is set every moment to be 25 to 80 vol. % /hr. based on chromatographic packing, the beet sugar solution before boiling can be demineralized so efficiently as to keep the sucrose production cost affordable.

From the same standpoint of minimizing the pressure loss in the chromatographic system and maintaining a given separation performance, the packing bed unit height in each packed column unit is preferably in the range of 0.8 to 3 meters.

A decrease in the number of circulating pumps in the simulated moving bed chromatographic separator is favorable for reduction in the cost of equipment construction. When that number is decreased excessively, however, the pressure loss at the outlet of each circulating pump is increased so that there may probably arise a case where internal liquid cannot be passed through the separator at a desired circulating flow rate, and that the circulating pumps, the packed column units, etc. must be designed to be pressure-resistant in order to give a high liquid pressure, which in turn disadvantageously raises the cost of equipment construction. From the foregoing standpoint, when the number of circulating pumps is at least half of the number of the packed column units, there are no cases where internal liquid is flowed and circulated outside the desired range of flow rate.

A strongly acidic cation exchange resin in a salt form such as the Na form and/or the K form is used as chromatographic packing (separating packing) from the standpoint of securing a high separation performance and preventing inversion of sucrose. Use of a strongly acidic cation exchange resin in the H form disadvantageously turns the circulating liquid acidic in the circulation system and hence brings about inversion of sucrose to naturally result in a loss of sucrose because invert sugar is not crystallized in the course of boiling. When use is made of a strongly acidic cation exchange resin in a salt form such as the Na form, however, the ionic form of the cation exchange resin is changed toward an ionic form composition equilibrated with various kinds of ions (mostly monovalent ions since the starting solution is one already softened) contained in the starting solution being fed (beet sugar solution before boiling) in keeping with the progress of chromatographic separation operation.

The average grain size and uniformity coefficient of the cation exchange resin as chromatographic packing are relevant to securing the desired circulating flow rate in the circulation system. For example, when the cation exchange resin exceeds 1.2 in uniformity coefficient or is smaller than 300 $\mu$m in average grain size [e.g., a strongly acidic cation exchange resin Amberlite (registered trademark) CG-6000 in Na form, manufactured by Rohm and Haas Company], a difficulty is encountered in flowing such an amount of the starting solution (beet sugar solution before boiling) as required for securing a target throughput because of an increase in the pressure loss even though the precision of separation may be good. Thus, the equipment must be scaled up and/or designed to be pressure-resistant for the purpose of securing the target throughput. On the other hand, when the average grain size of the cation exchange resin exceeds 500 $\mu$m, the precision of separation is disadvantageously deteriorated. By contrast, use of a strongly acidic cation exchange resin in a salt form having an average grain size of 300 to 500 $\mu$m and a uniformity coefficient of at most 1.2 (e.g., a strongly acidic cation exchange resin Amberlite CR-1320 in the Na form, manufactured by Rohm and Haas Company) enables efficient chromatographic separation to be effected with a small pressure loss while maintaining a given precision of separation.

Where the packing bed unit height exceeds 3 meters, the precision of separation is improved, but the lower part of the packed resin tends to be crushed by gravity to increase the pressure loss in each packed column unit during internal liquid passage with a difficulty encountered in securing the desired circulating flow rate in the system, and the packed column units, the circulating pumps, etc. must be designed to be pressure-resistant with an increase in the equipment cost even if the chromatographic separator is run under conditions involving a starting solution feed rate/eluent water withdrawal rate volume ratio of 1/2.5 to 1/3.5, a strong-affinity component fraction withdrawal rate/weak-affinity component fraction withdrawal rate volume ratio of 0.5/1 to 1.2/1 and a circulating flow rate of 25 to 80 vol. %/hr. based on chromatographic packing in a slowest flow velocity zone in the circulation system. On the other hand, where the packing bed unit height is smaller than 0.8 meter, the number of packed column units (packing bed units) may inevitably be increased, leading to such increases in the number of circulating pumps, the number of feed inlets and the number of withdrawal outlets for securing a desired sucrose purity as to complicate the equipment and increase the equipment construction cost, although the pressure loss in each packed column unit during internal liquid passage is diminished. Additionally stated, the total height of the packing bed units in all the packed column units is preferably 8 to 24 meters, further preferably 10 to 20 meters, for securing the desired sucrose purity, and the number of the packed column units (packing bed units) can therefore be determined in accordance with the desired total height of the packing bed units in all the packed column units.

Meanwhile, the chromatographic separation temperature in the present invention is preferably 60 to 90° C., more preferably 75 to 85° C., in order to prevent growth of bacteria and keep the viscosity of circulating liquid (sucrose-containing solution portion in particular) low. When this temperature is too high, there arises a fear of decomposition of the cation exchange resin as chromatographic packing.

When the pH value of circulating liquid in the circulation system is lowered during chromatographic separation, part of sucrose is liable to be inverted to form fructose and glucose, On the other hand, when it becomes too high, sucrose is subject to isomerization. Thus, eluent water is preferably adjusted to a pH value of 8 to 11.

Examples of the starting solution (beet sugar solution before boiling) that can be demineralized according to the process of the present invention include a beet sugar solution after softening in the aforementioned method (1) as a conventional beet sugar refining method, a beet sugar solution after carbonation and filtration in the aforementioned method (2), and a beet sugar solution to be subjected to the chromatographic separation step of the aforementioned method (3). The inventors of the present invention have also proposed a sucrose refining method that can eliminate the demerits of the above-mentioned methods (1) to (3) (Japanese Patent Laid-Open No. 42,899/1998). A beet sugar solution to be subjected to the chromatographic separation step of this refining method can also advantageously be demineralized according to the process of the present invention. incidentally, when crystallized sucrose is to be obtained, the sucrose fraction obtained by chromatographic separation is, of course, concentrated either as such or after subjected to ion exchange treatment, if necessary, in accordance with the method proposed in Japanese Patent Laid-Open No. 42,899/1998, and then boiled as described in connection with the methods (1) to (3). On the other hand, when a sucrose solution is to be obtained as liquid sugar, the sucrose fraction may be treated as a product either as it is, or after subjected to ion exchange treatment and/or suitable adjustment of the sucrose concentration thereof.

A brief and specific description will now be made of a representative case of refining sucrose from sugar beet according to the above-mentioned sucrose refining method proposed in Japanese Patent Laid-Open No. 42,899/1998. Lime milk is added to sucrose-containing raw juice (beet extraction liquor) obtained by extraction of cut sugar beet, into which juice carbon dioxide is then blown to form a calcium carbonate precipitate on which impurities are adsorbed for removal thereof. The foregoing so-called "carbonation" removes viscous substances and the like from the raw juice. After subsequent filtration, the resultant sucrose-containing filtrate is softened with a cation exchange resin in the Na and/or K form. Such softening is mainly aimed at removing hardness components in general and calcium in particular for the purpose of preventing precipitation of the hardness components in a concentrator (thickener) and lowering of the heat transfer efficiency of the concentrator and for the purpose of preventing conversion of the ionic form of a cation exchange resin used as chromatographic packing (separating packing) into a bivalent ion form poor in separating efficiency in the chromatographic separation step. The sucrose-containing softened solution is then concentrated to a solids content of, e.g., 60 to 70 wt. % for the purpose of enhancing the efficiency of chromatographic separation. The resultant sucrose-containing concentrate is subjected to the chromatographic separation step according to the process of the present invention. The fractionated sucrose fraction is subjected to ion exchange treatment. The ion-exchanged sucrose solution is concentrated and then boiled to obtain high-purity sucrose crystals at a high recovery. The above-mentioned ion exchange treatment in this method is aimed at removing around 20 wt. % of salts remaining after removal of around 80 wt. % of salts in the above-mentioned chromatographic separation step. Various modes of ion exchange treatment may be employed, examples of which include a mode of series solution passage in the following order: strongly acidic cation exchange resin→weakly basic anion exchange resin→strongly basic anion exchange resin→weakly acidic cation exchange resin, a mode of series solution passage in the following order: medium base anion exchange resin→weakly acidic cation exchange resin, and a mode of series solution passage in the following order: strongly basic anion exchange resin→weakly acidic cation exchange resin (Japanese Patent Laid-Open No. 42,899/1998).

A 2-component separation simulated moving bed chromatographic separator can be used as the simulated moving bed chromatographic separator to be used in the process of the present invention. This separator is equipment for separating components contained in the starting solution material into 2 fractions, an example of which is a separator constructed in such a way that a starting solution material feed inlet, an eluent feed inlet, an extract withdrawal outlet and a raffinate withdrawal outlet are displaced in the downstream direction at predetermined time intervals. Use can be made either of a representative 2-component separation simulated moving bed chromatographic separator as disclosed in Japanese Patent Publication No. 15,681/1967, or of various simulated moving bed chromatographic separators altered therefrom, examples of which include one disclosed in Japanese Patent Laid-Open No. 49,159/1990 (equipment for carrying out a simulated moving bed chromatographic separation process comprising a feed and withdrawal step and a simple circulation step), and those disclosed in Japanese Patent Laid-Open Nos. 141,311/1996, 334,503/1992, 367, 701/1992, etc. Thus, the term "simulated moving bed chromatographic separator" as used in the present invention is intended to encompass these various separators.

A generic and simple description will now be made of a representative example of a simulated moving bed chromatographic separator usable in the process of the present invention. This separator comprises a system comprising a plurality of packed column units linked in endless series and packed with solid sorbent (chromatographic packing, or separating packing) having a selective sorptivity for a specific component of at least 2 components contained in a starting material ("beet sugar solution before boiling" as the starting solution in the present invention), a means for circulating internal fluid in one direction in the system, a starting material feed means for choosing any one of the packed column units and feeding thereto the starting material, an eluent feed means for choosing any other one of the packed column units and feeding thereto eluent (eluent water in the present invention), a first fluid withdrawal means for choosing any one of the packed column units and withdrawing therefrom raffinate (nonsucrose fraction solution mainly containing salts in the present invention) out of the system, a second fluid withdrawal means for choosing any other one of the packed column units and withdrawing therefrom extract (sucrose fraction solution in the present invention) out of the system, and a switching control means for sequentially displacing the fluid feed positions and the fluid withdrawal positions in the downstream direction of internal fluid flow in the system while maintaining the mutual relationship between the fluid feed positions and the fluid withdrawal positions in the system. Every packed column unit usually has one packing bed unit, but may have at least 2 mutually partitioned packing bed units, each of which may be provided with a starting material feed means, an eluent feed means, a first fluid withdrawal means and a second fluid withdrawal means as described just above, if necessary.

A generic and simple description will now be made of an example of a simulated moving bed chromatographic 2-component separation procedure using this simulated moving bed chromatographic separator. The group of the packed column units (group of packing bed units) linked in endless series is regarded as being divided into first, second, third and fourth sections in the downstream direction of circulating fluid when viewed from the eluent feed position. Eluent (eluent water in the present invention) is fed via a feed valve to circulating fluid at the inlet of a packed column unit (packing bed unit) positioned foremost in the first section and extract large in the amount of a sorbed component (sucrose fraction solution in the present invention) is withdrawn via a withdrawal valve from circulating fluid at the outlet of a packed column unit (packing bed unit) positioned rearmost in the first section, while a starting material is fed via a feed valve to circulating fluid at the inlet of a packed column unit (packing bed unit) positioned foremost in the third section and raffinate small in the amount of the sorbed component (nonsucrose fraction solution mainly containing salts in the present invention) is withdrawn via a withdrawal valve from circulating fluid at the outlet of a packed column unit (packing bed unit) positioned rearmost in the third section. The eluent feed position, the extract withdrawal position, the starting material feed position, and the raffinate withdrawal position are each operationally displaced one by one in the downstream direction in keeping with the movement of a zone wherein the component in the starting material is sorbed on sorbent.

In the present invention, the ratio $U2/Us$ of the circulating flow rate ($U2$) in the second section ranging from the extract (strong-affinity component fraction, i.e., sucrose fraction) withdrawal outlet to the starting solution inlet to the apparent moving velocity (Us) of the fixed phase (chromatographic packing) is preferably 0.35 to 0.45 in order to keep the sucrose purity and sucrose recovery of the sucrose fraction high. The reasons for this are as follows: When the ratio U2/Us is lower than 0.35, part of sucrose tends to go round via the first section ranging from the eluent water feed inlet to the extract withdrawal outlet into the fourth section ranging from the raffinate (weak-affinity component fraction, i.e., nonsucrose fraction containing salts and the like) withdrawal outlet to the eluent water feed inlet, thereby to lower the sucrose recovery of the sucrose fraction. Accordingly, a large amount of eluent water becomes necessary in order to increase the sucrose recovery under such conditions that the ratio U2/Us is lower than 0.35. When the ratio U2/Us exceeds 0.45, the proportion of mixed nonsucrose compds. (as described later) in the sucrose fraction is lowered, but part of sucrose tends to be withdrawn from the raffinate withdrawal outlet via the third section ranging from the starting solution feed inlet to the raffinate withdrawal outlet, thereby to lower the sucrose recovery of the sucrose fraction. Herein, U2=[circulating flow rate (U4) in slowest flow velocity zone×amount of whole chromatographic packing]+[feed rate of eluent water]−[withdrawal rate of sucrose fraction], wherein the slowest flow velocity zone corresponds to the fourth section.

MODE FOR CARRYING OUT THE INVENTION

Figure 1:
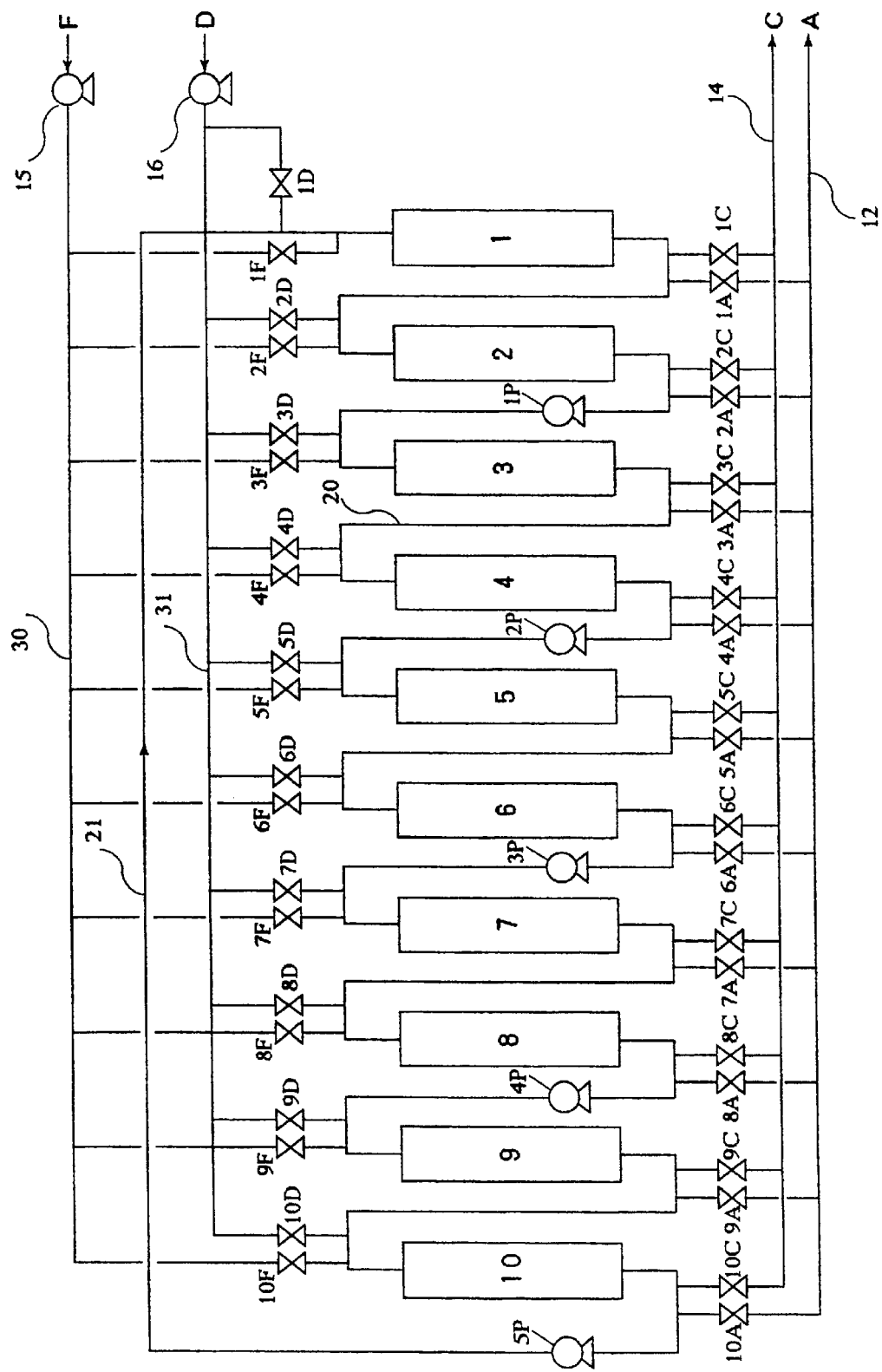
FIG. 1 is a schematic illustration of an example of the constitution of a simulated moving bed chromatographic separator that may be used for carrying out the process of the present invention.

A mode for carrying out the present invention will now be described while referring to the accompanying drawing, but should not be construed as limiting the scope of the present invention.

FIG. 1 is a schematic illustration of an example of the constitution of a simulated moving bed chromatographic separator that may be used for carrying out the process of the present invention. In FIG. 1, numerals 1 to 10 refer to packed column units, 1A to 10A to raffinate withdrawal valves, 1C to 10C to extract withdrawal valves, 1D to 10D to eluent water feed valves, 1F to 10F to starting solution feed valves, A to raffinate (nonsucrose fraction solution mainly containing salts), C to extract (sucrose fraction solution), D to eluent water, F to starting solution (beet sugar solution before boiling), 12 to a raffinate withdrawal piping, 14 to an extract withdrawal piping, 15 to a starting solution feed pump, 16 to an eluent water feed pump, 1P to 5P to circulating pumps, 20 and 21 to connecting pipings, 30 to a starting solution feed piping, and 31 to an eluent water feed piping.

The ends of the packed column units 1 to 10 are endlessly linked with the tops of the respective next packed column units by means of the connecting pipings 20 and 21. Each of the raffinate withdrawal valves 1A to 10A and each of the extract withdrawal valves 1C to 10C are connected to the connecting pipings on the downstream side packed column unit, while connecting the connecting pipings with each of branch pipes having the respective starting solution feed valves 1F to 10F and branched from the starting solution feed piping 30 for the starting solution being fed by the starting solution feed pump 15, and with branch pipes having the respective eluent water feed valves 1D to 10D and branched from the eluent water feed piping 31 for eluent water being fed by the eluent water feed pump 16 on the upstream side of each packed column unit. The raffinate withdrawal valves 1A to 10A are connected to the raffinate withdrawal piping 12, while the extract withdrawal valves 1C to 10C are connected to the extract withdrawal piping 14. The circulating pumps 1P to 4P are respectively connected to the connecting piping 20 between packed column units 2 and 3, 4 and 5, 6 and 7, and 8 and 9, while the circulating pump 5P is connected to the middle of the connecting piping 21 extended from the end of the packed column unit 10 to the top of the packed column unit 1. The separator of FIG. 1 is provided with the five circulating pumps 1P to 5P, which are capable of controlling the circulating flow rate to any set points in accordance with a flow rate sequence program with the aid of a controller not shown in the figure. Needless to say, the installing sites and the number of circulating pumps are not limited to the embodiment of FIG. 1. Further, the feed valves and the withdrawal valves are each controlled to be opened or closed in accordance with a predetermined valve opening and closing sequence program by means of the controller not shown in the figure. Although the number of packed column units is 10 in FIG. 1, it is not limited thereto.

A description will now be made of the running operations of the simulated moving bed chromatographic separator of FIG. 1. In Stage 1, for example, the starting solution feed valve 6F is opened to feed the starting solution via the top of the packed column unit 6 and the eluent water feed valve 1D is opened to feed eluent water via the top of the packed column unit 1, while the extract withdrawal valve 2C is opened to withdraw extract containing much sucrose from the end of the packed column unit 2 and the raffinate withdrawal valve 9A is opened to withdraw raffinate containing much nonsucrose compounds such as salts from the end of the packed column unit 9. Simultaneously, internal liquid in the circulation system is circulated by means of the circulating pumps 1P to 5P.

In this case, therefore, a first section ranging from the eluent water feed inlet to the extract withdrawal outlet involves 2 packed column units, a second section ranging from the extract withdrawal outlet to the starting solution feed inlet involves 3 packed column units, a third section ranging from the starting solution feed inlet to the raffinate withdrawal outlet involves 4 packed column units, and a fourth section ranging from the raffinate withdrawal outlet to the eluent water feed inlet involves 1 packed column unit. Needless to say, however, the present invention is not limited to the mode of this case.

In Stage 2 after the lapse of predetermined time, the eluent water feed valve 1D opened in Stage 1 is closed and the eluent water feed valve 2D is instead opened, while the opened extract withdrawal valve is displaced from 2C to 3C, the opened starting solution feed valve from 6F to 7F, and the opened raffinate withdrawal valve from 9A to 10A in the same manner as described just above.

Stages 3 to 10 of chromatographic separation are performed according to the foregoing operation of sequentially displacing every one of the opened valves by one packed column unit on the downstream side in the flowing direction of circulating liquid every stage (every predetermined time as mentioned above). Such switching of valves results in performing an operation which apparently looks as if it moved the chromatographic packing in the direction opposite to the flowing direction of circulating liquid. Stages 1 to 10 of such chromatographic separation are repeated to run the separator continuously.

Although the foregoing procedure has been described in connection with a state wherein the separator is continuously run, a preliminary step of performing only an operation of feeding the starting solution into the system of the separator to form sorption zones of components sequentially separated and ranging from the component having a weak affinity for sorbent to the component having a strong affinity for sorbent may be done in order to start up the separator before the foregoing continuous run thereof.

EXAMPLES

The following Example will specifically illustrate the present invention in comparison with Comparative Examples, but should not be construed as limiting the scope of the present invention. Incidentally, in the following Example and Comparative Examples, use was made of a simulated moving bed chromatographic separator having a constitution as illustrated in FIG. 1, and the "proportion of mixed nonsucrose compds." indicates the proportion of the amount of nonsucrose compounds mixed in the sucrose fraction to the total amount of nonsucrose compounds, such as salts, contained in the starting solution. Further, the pressure loss of circulating liquid through packed column units can be indirectly estimated by the "average liquid pressure at top of packed column unit" because a circulating pump pressure was applied, which satisfied predetermined operating conditions. Thus, it may be reasonable to think that the higher that average liquid pressure, the greater the pressure loss.

Example 1

A beet sugar solution before boiling, which was subjected as the starting solution to chromatographic separation in this Example, was a sucrose-containing softened solution obtained through steps of sugar beet cutting, extraction, carbonation, filtration and softening in a beet sugar factory, and having a sucrose concentration (Bx: Brix concentration) of 65 and the following solids-based composition: 93% sucrose, 4% nonsucrose compounds such as salts, and 3% other organic compounds (other saccharides, betaine, amino acids, etc.). Incidentally, the "solids-based composition" is expressed in terms of areal percentage in high-performance liquid chromatography using a sodium-form ion exchange column and a differential refractometer.

The details of the simulated moving bed chromatographic separator used in this Example were as follows:
<Details of Separator>
  Each Packing Bed Unit: 108 mm in diameter×1600 mm in height
  Number of Packing Bed Units: 10
  Total Amount of Chromatographic Packing: 150 liters
  Number of Circulating Pumps: 5
  Chromatographic Packing: Amberlite CR-1320 in Na Form (gel type strongly acidic cation exchange resin manufactured by Rohm and Haas Company, uniformity coefficient: 1.1, average grain size: 330 µm)

Operating conditions of the separator were as follows:
<Operating Conditions>
  Operating Temperature: 80° C.
  Feed Rate of Starting Solution: 12 liters/hr.
  Feed Rate of Eluent Water: 40 liters/hr.
  Withdrawal Rate of Sucrose Fraction: 22 liters/hr.
  Withdrawal Rate of Nonsucrose Fraction: 30 liters/hr.
  Apparent Moving Velocity of Fixed Phase (Packing): 16.5 liters/hr.
  Circulating Flow Rate (in slowest flow velocity zone): 0.6 liter/liter-packing/hr.
  Average Liquid Pressure at Top of Packed Column Unit: 3.0 kg/cm$^2$ The results of separation were as follows:
<Results of Separation>
  Sucrose Fraction: Sucrose Recovery: 99.4%
    Proportion of Mixed Nonsucrose Compds.: 20%
    Sucrose Concentration (Bx): 38

Comparative Example 1

The same simulated moving bed chromatographic separator as used in Example 1 was used to effect chromatographic separation of the same starting solution as in Example 1 under the following operating conditions:
<Operating Conditions>
  Operating Temperature: 80° C.
  Feed Rate of Starting Solution: 12 liters/hr.
  Feed Rate of Eluent Water: 72 liters/hr.
  Withdrawal Rate of Sucrose Fraction: 34 liters/hr.
  Withdrawal Rate of Nonsucrose Fraction: 50 liters/hr.
  Apparent Moving Velocity of Fixed Phase (Packing): 16.5 liters/hr.
  Circulating Flow Rate (in slowest flow velocity zone): 0.34 liter/liter-packing/hr.
  Average liquid Pressure at Top of Packed Column Unit: 3.0 kg/cm$^2$ The results of separation were as follows:
<Results of Separation>
  Sucrose Fraction: Sucrose Recovery: 99.2%
    Proportion of Mixed Nonsucrose Compds.: 18%
    Sucrose Concentration (Bx): 18

In this Comparative Example, which is a case where the feed rate of eluent water was increased as against the feed rate of the starting solution for increasing the demineralization rate (starting solution feed rate/eluent water feed rate volume ratio=1/6), the proportion of mixed nonsucrose compds. (conversely speaking, roughly indicative of demineralization rate) was slightly lower than that in Example 1. This will slightly lower the load on ion exchange treatment if further demineralization is done by the ion exchange treatment after the chromatographic separation, and hence will decrease the amounts of regenerants for use in regeneration of ion exchange resins. In this Comparative Example, however, the sucrose concentration of the sucrose fraction as the desired fraction was by far lower than that in Example 1 to require a huge energy cost for concentration in preparation for boiling. Thus, the operating conditions in this Comparative Example are improper.

Comparative Example 2

The same simulated moving bed chromatographic separator as used in Example 1 was used to effect chromatographic separation of the same starting solution as in Example 1 under the following operating conditions:
<Operating Conditions>
  Operating Temperature: 80° C.
  Feed Rate of Starting Solution: 12 liters/hr.
  Feed Rate of Eluent Water: 40 liters/hr.
  Withdrawal Rate of Sucrose Fraction: 17 liters/hr.
  Withdrawal Rate of Nonsucrose Fraction: 35 liters/hr.
  Apparent Moving Velocity of Fixed Phase (Packing): 16.5 liters/hr.
  Circulating flow Rate (in slowest flow velocity zone): 0.34 liter/liter-packing/hr.

Average Liquid Pressure at Top of Packed Column Unit: 3.5 kg/cm$^2$

The results of separation were as follows:

<Results of Separation>

Sucrose Fraction: Sucrose Recovery: 90.4%
 Proportion of Mixed Nonsucrose Compds.: 19%
 Sucrose Concentration (Bx): 43

In this Comparative Example, which is a case where the strong-affinity component fraction (sucrose fraction) withdrawal rate/weak-affinity component fraction (nonsucrose fraction enriched with salts and the like) rate volume ratio was set to be 0.486/1 for increasing the demineralization rate and the purity of recovered sucrose, a large amount of sucrose to be recovered was mixed in the nonsucrose fraction to give rise to a large sucrose loss. The sucrose loss was too large for it to be made up for by a cost reduction in concentration and a cost reduction that will ensue from decreases in the amounts of regenerants used for regeneration of ion exchange resins due to a decrease in the load on ion exchange treatment if further demineralization is done by the ion exchange treatment after the chromatographic separation. Thus, the operating conditions in this Comparative Example are improper.

Comparative Example 3

The same simulated moving bed chromatographic separator as used in Example 1 was used to effect chromatographic separation of the same starting solution as in Example 1 under the following operating conditions:

<Operating Conditions>

Operating Temperature: 80° C.

Feed Rate of Starting Solution: 3 liters/hr.

Feed Rate of Eluent Water: 10 liters/hr.

Withdrawal Rate of Sucrose Fraction: 5.5 liters/hr.

Withdrawal Rate of Nonsucrose Fraction: 7.5 liters/hr.

Apparent Moving Velocity of Fixed Phase (Packing): 4.13 liters/hr.

Circulating Flow Rate (in slowest flow velocity zone): 0.085 liter/liter-packing/hr.

Average Liquid Pressure at Top of Packed Column Unit: 2.0 kg/cm$^2$

The results of separation were as follows:

<Results of Separation>

Sucrose Fraction: Sucrose Recovery: 99.4%
 Proportion of Mixed Nonsucrose Compds.: 20%
 Sucrose Concentration (Bx): 38

This Comparative Example, which is a case where the circulating flow rate in a slowest flow velocity zone in the circulation system was set to be 8.5 vol. %/hr. based on chromatographic packing, corresponds to a case where a conventional chromatographic separator is run at a general throughput (operating conditions are, for example, similar to those in Examples of PCT International Publication No. WO 95/16794). In this Comparative Example, the operation could be smoothly performed under low liquid pressures in the packed column units, the precision of separation was so good that it will lower the load on ion exchange treatment and hence decrease the amounts of regenerants used for regeneration of ion exchange resins if further demineralization is done by the ion exchange treatment after the chromatographic separation, and the amount of used eluent water was so small with so high a sucrose concentration of the sucrose fraction as to lower the concentration cost. In this Comparative Example, however, the throughput per hour, based on chromatographic packing, was as far small as ¼ of that in Example 1, whereby a beet sugar factory will require so large a separator for attaining a necessary throughput that the product cost will consequently become comparatively high.

Comparative Example 4

The same simulated moving bed chromatographic separator as used in Example 1 was used to effect chromatographic separation of the same starting solution as in Example 1 under the following operating conditions:

<Operating Conditions>

Operating Temperature: 80° C.

Feed Rate of Starting Solution: 12 liters/hr.

Feed Rate of Eluent Water: 28 liters/hr.

Withdrawal Rate of Sucrose Fraction: 17 liters/hr.

Withdrawal Rate of Nonsucrose Fraction: 23 liters/hr.

Apparent Moving Velocity of Fixed Phase (packing): 16.5 liters/hr.

Circulating Flow Rate (in slowest flow velocity zone): 0.34 liter/liter-packing/hr.

Average Liquid Pressure at Top of Packed Column Unit: 3 kg/cm$^2$

The results of separation were as follows:

<Results of Separation>

Sucrose Fraction: Sucrose Recovery: 95.1%
 Proportion of Mixed Nonsucrose Compds.: 30%
 Sucrose Concentration (Bx): 45

In this Comparative Example, which is a case where the feed rate of eluent water was decreased as against the feed rate of the starting solution for decreasing the amount of eluent water (starting solution feed rate/eluent water feed rate volume ratio=1/2.33), the sucrose recovery of the sucrose fraction was greatly lowered with an increase in the proportion of mixed nonsucrose compds., whereby the load on ion exchange treatment will rise to increase the amounts of regenerants used for regeneration of ion exchange resins if farther demineralization is done by the ion exchange treatment after the chromatographic separation. Thus, the operating conditions in this Comparative Example are improper.

Comparative Example 5

The same simulated moving bed chromatographic separator as used in Example 1 was used to effect chromatographic separation of the same starting solution as in Example 1 under the following operating conditions:

<Operating Conditions>

Operating Temperature: 80° C.

Feed Rate of Starting Solution: 12 liters/hr.

Feed Rate of Eluent Water: 40 liters/hr.

Withdrawal Rate of Sucrose Fraction: 29 liters/hr.

Withdrawal Rate of Nonsucrose Fraction: 23 liters/hr.

Apparent Moving Velocity of Fixed Phase (Packing): 16.5 liters/hr.

Circulating Flow Rate (in slowest flow velocity zone): 0.34 liter/liter-packing/hr.

Average Liquid Pressure at Top of Packed Column Unit: 3 kg/cm$^2$

The results of separation were as follows:

<Results of Separation>

Sucrose Fraction: Sucrose Recovery: 99.6%
 Proportion of Mixed Nonsucrose Compds.: 35%
 Sucrose Concentration (Bx): 29

In this Comparative Example, which is a case where the strong-affinity component fraction (sucrose fraction) withdrawal rate/weak-affinity component fraction (nonsucrose fraction enriched with salts and the like) withdrawal rate volume ratio was set to be 1.26/1 for increasing the sucrose recovery of the sucrose fraction, the proportion of mixed nonsucrose compds. was greatly increased despite not so much an increase in the sucrose recovery, whereby the load on ion exchange treatment will rise to increase the amounts of regenerants used for regeneration of ion exchange resins if further demineralization is done by the ion exchange treatment after the chromatographic separation. Thus, the operating conditions in this Comparative Example are improper.

Comparative Example 6

The same simulated moving bed chromatographic separator as used in Example 1 was used to effect chromatographic separation of the same starting solution as in Example 1 under the following operating conditions:
<Operating Conditions>
Operating Temperature: 80° C.
Feed Rate of Starting Solution: 30 liters/hr.
Feed Rate of Eluent Water: 100 liters/hr.
Withdrawal Rate of Sucrose Fraction: 55 liters/hr.
Withdrawal Rate of Nonsucrose Fraction: 75 liters/hr.
Apparent Moving Velocity of Fixed Phase (Packing): 41.3 liters/hr.
Circulating Flow Rate (in slowest flow velocity zone): 0.85 liter/liter-packing/hr.
Average Liquid Pressure at Top of Packed Column Unit: 10 kg/cm$^2$
The results of separation were as follows:
<Results of Separation>
Sucrose Fraction: Sucrose Recovery: 99.0%
Proportion of Mixed Nonsucrose Compds.: 25%
Sucrose Concentration (Bx): 38
In this Comparative Example, which is a case where the circulating flow rate in a slowest flow velocity zone in the circulation system was set to be 85 vol. %/hr. based on chromatographic packing for increasing the throughput, the liquid pressures on the tops of packed column units were heightened. Accordingly, a pressure-resistant and hence expensive separator must be used as actual equipment. In this Comparative Example, the separation load on the cation exchange resin as chromatographic packing was also increased to give poor results of separation, involving a decrease in the sucrose recovery of the sucrose fraction.

As demonstrated in the foregoing Example 1 and Comparative Examples 1 to 6, in order to efficiently effect demineralization of the starting solution in the form of a beet sugar solution before boiling by chromatographic separation thereof at as low an equipment cost as possible, the starting solution must be flowed at a high flow velocity (high flow rate) under liquid pressures to which generally designed equipment can resist in the packed column units thereof. As a result of intensive investigations on various operating conditions of a simulated moving bed chromatographic separator with a view to solving the foregoing problem believed to be extremely hard to overcome, the inventors of the present invention have found an industrially useful demineralization process and further a preferable packing bed unit height.

INDUSTRIAL APPLICABILITY

According to the present invention, a beet sugar solution before boiling can be efficiently demineralized using as small an amount of eluent water as possible according to an ion exclusion mode of simulated moving bed chromatographic separation procedure without using a regenerant for chromatographic packing to separate therefrom sucrose in a concentrated state. Further, according to the present invention, the throughput of a given simulated moving bed chromatographic separator can be increased as compared with that in the case of the conventional method, and, conversely speaking, the capacity of simulated moving bed chromatographic separator can be decreased while securing a high throughput capacity as desired. Where a sucrose fraction obtained through the chromatographic separation step is later subjected to ion exchange treatment, an ion exchange treatment unit can be miniaturized to decrease the amounts of regenerants for regeneration of ion exchange resins used therein and the amount of regeneration waste (wastewater) as well.

What is claimed is:

1. A demineralization process for demineralizing a beet sugar solution before sugar boiling as the starting solution with a simulated moving bed chromatographic separator comprising a plurality of packed column units packed with a strongly acidic cation exchange resin in a salt form having an average grain size of 300 to 500 $\mu$m and a uniformity coefficient of at most 1.2 as chromatographic packing and linked in endless series to form a circulation flow path, each of said packed column units being provided with a starting solution feed inlet, an eluent water feed inlet, a withdrawal outlet for a fraction of a component having a strong affinity for chromatographic packing ("strong-affinity component"), and a withdrawal outlet for a fraction of a component having a weak affinity for chromatographic packing ("weak-affinity component"); characterized in that use is made of circulating pumps, the number of which is at least half of the number of said packed column units, and in that said beet sugar solution before sugar boiling is demineralized under such conditions that the starting solution feed rate/eluent water feed rate volume ratio is 1/2.5 to 1/3.5, the strong-affinity component fraction withdrawal rate/weak-affinity component fraction withdrawal rate volume ratio is 0.5/1 to 1.2/1, and the circulating flow rate per hour is 25 to 80 vol. % based on chromatographic packing in a zone where the flow velocity is slowest in the circulation system.

2. A demineralization process as claimed in claim 1, wherein the packing bed unit height in each of said packed column units is 0.8 to 3 meters.

* * * * *